INVENTOR
Frans Brouwer.

INVENTOR
Frans Brouwer.

By William J. Newman
Attorney

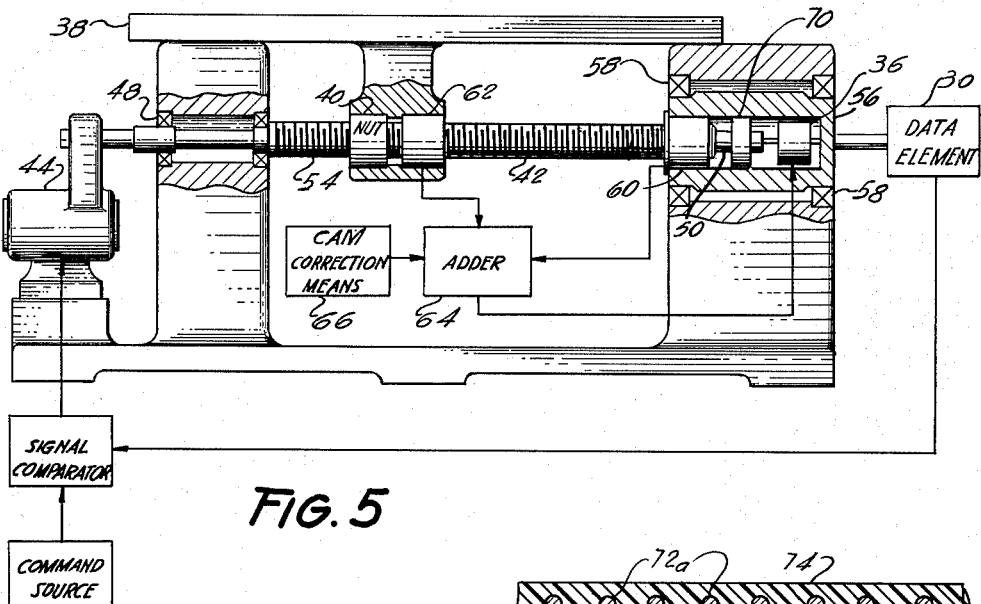
FIG. 5
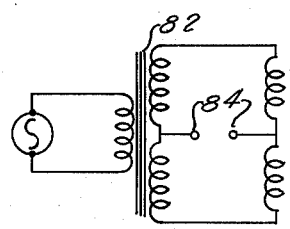
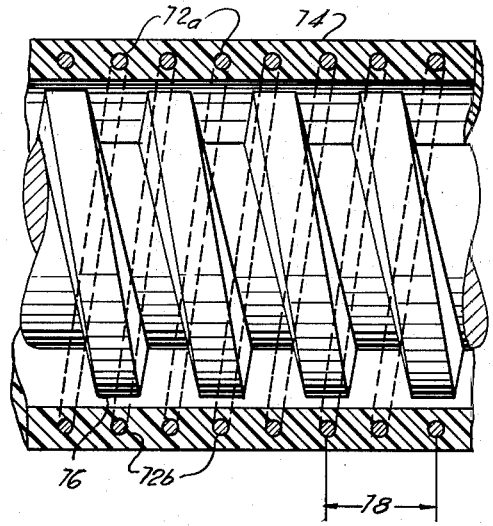
FIG. 6.
FIG. 7.
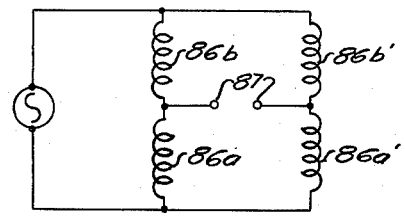
FIG. 9.
INVENTOR
Frans Brouwer.
By William J. Newman
Attorney

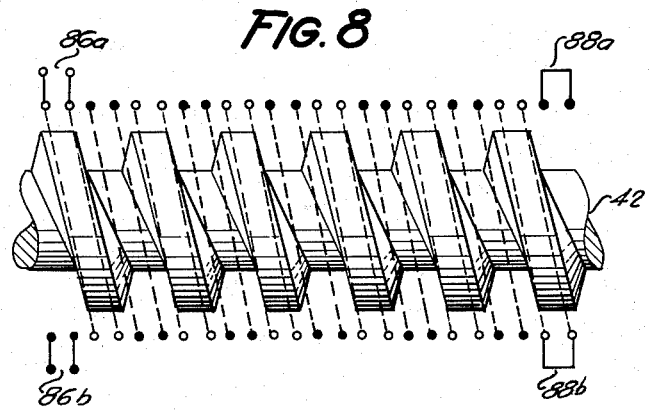
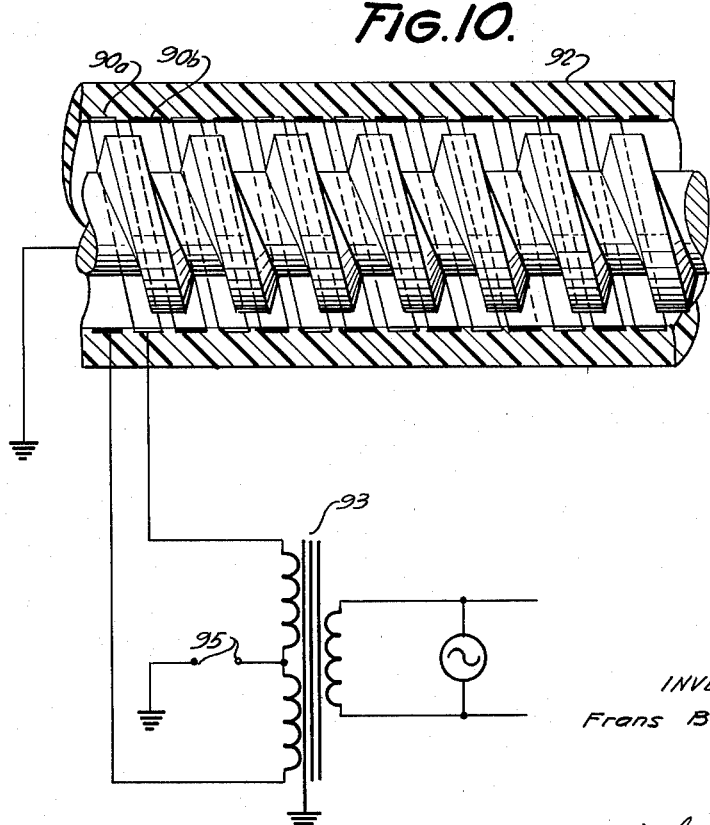

United States Patent Office 3,241,389
Patented Mar. 22, 1966

3,241,389
APPARATUS FOR POSITIONING MACHINE ELEMENTS
Frans Brouwer, Glencoe, Ill., assignor to Stewart-Warner Corporation, Chicago, Ill., a corporation of Virginia
Filed Nov. 26, 1963, Ser. No. 325,885
22 Claims. (Cl. 74—424.8)

This invention relates to positioning apparatus and more particularly to highly accurate position measuring devices and control systems useful for the automatic operation of machine tools, or the like.

An ordinary control system for automatically positioning a machine element comprises a servo system in which a reference electrical signal representative of the desired position is caused to energize a drive motor to move the machine element. The machine element causes a feedback signal to be generated responsive to its actual position which is compared with the reference signal. The difference represents the error between the actual and desired position and is used to energize the drive motor. Thus, no error due to linkages between the drive motor and the machine element are introduced into the control system. There are, however, circumstances in which the ordinary type system is not convenient and other means must be used in which coupling errors are introduced.

Although certain aspects of this invention are applicable to diverse types of machine drives, the fundamentals will be most easily understood with reference to rotary to linear conversion machine drives such as lead screws or rack and pinion types. While the following discussion will be primarily in terms of these drives, it is to be recognized that other types may be acceptable for the practice of this invention.

The merits of the system and components of the present invention lie in the fact that while they employ the use of couplings with their inherent errors, most of these errors are removed from the resultant signal and the position of the machine is accurately controlled. In addition, the systems of this invention accomplish their result in a most efficient manner and with the minimum expense necessary for system components. A particularly attractive feature of the present invention lies in the fact that it is readily adaptable to existing machines without requiring major modifications and expenditures.

Generally a system involving the teachings of this invention comprises means for developing an electric signal which represents approximately the position of the machine element. The signal means is operated by the coupling means between the drive motor and the machine element. For example, in the case of a lead screw type machine, a data element of any well known type might be driven directly by the lead screw. However, errors are introduced in the coupling means which are not represented in the output of the signal means or data element. Means for producing a second signal are, therefore, provided which are coupled with the coupling means to produce electric signals which represent the coupling errors. More specifically, with respect to the lead screw machines, one or more transducers employing electrical coils arranged in signal producing circuitry are positioned about the lead screw so that the electrical characteristics of the coil are altered in accordance with the coupling errors. The signals produced by the circuitry are representative of the coupling errors and are caused to alter the data element signal so as to represent the actual condition of the machine element.

Another feature of this invention is the construction of a transducer for measuring errors in the coupling means which comprises a first electrical winding having a regular repetitive configuration of predetermined pitch, such as a helical coil and a second electrical winding having a substantially identical regular repetitive configuration and pitch. The two windings are superimposed in a uniformly spaced manner and energized by an electric signal. They are positioned in operative relationship with a non-signal carrying member (e.g. the lead screw) which also has a regular and repetitive configuration of equal pitch as said windings so that the electrical characteristics of the windings are affected as the member is translated with respect to the windings.

It is, therefore, an object of this invention to provide a unique machine element position control system.

It is also an object of this invention to provide a unique and highly accurate machine element position control system which uses a portion of the coupling means in the drive train to correct for coupling errors.

It is also an object of this invention to provide a unique position determining device which may be used in the described system for measuring error in the coupling means.

Other objects and advantages of this invention will become clearly evident with a further reading of the specification especially when taken in view of the accompanying drawings, in which;

FIG. 5 is a modification of the apparatus shown in FIG. 4;

FIG. 6 is a detailed sectional view of a transducer for use in the systems of FIGS. 1 through 5;

FIG. 7 is a schematic diagram for a circuit to be used with the transducer of FIG. 6;

FIG. 8 is a schematic representation of a modification of the transducer of FIG. 6;

FIG. 9 is a schematic diagram of a circuit to be used with the transducer of FIG. 8;

FIG. 10 is another modification of the transducer and includes in schematic representation the electrical circuit therefor;

Figure 1:
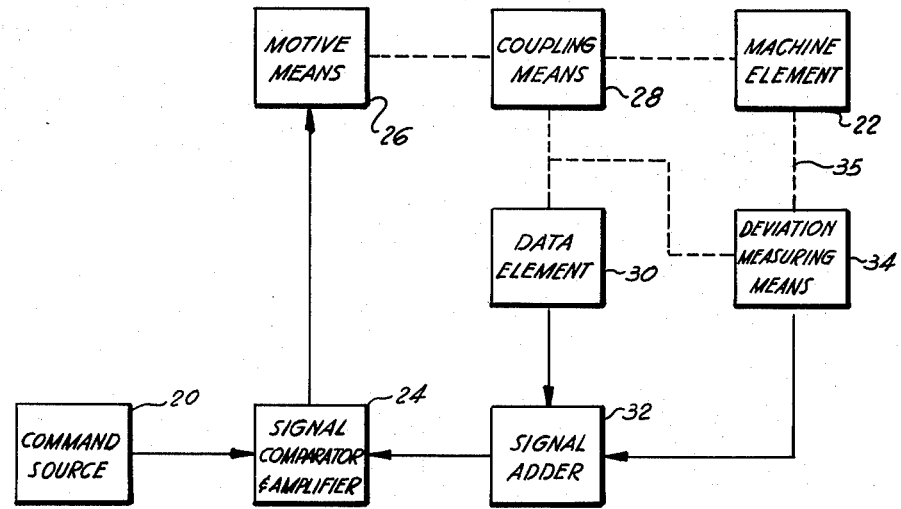
FIG. 1 is a block diagram of a system employing the teachings of this invention for use with lead screw type machine drives.

Referring now to FIG. 1 there is shown a machine element position control system in which a signal is derived at a command source 20 which is representative of a desired position to which a machine element 22 is to be moved. The command source is electrically connected to a signal comparator and amplifier 24 which is in turn connected to motive means 26 in the form of an electric drive motor or the like. The motive means 26 positions the machine element 22 through coupling means 28 which may take the form of a rack and pinion or lead screw and bearing nut drive.

The coupling means 28 also drives a signal producing means such as a data element 30 in which a signal is derived which is representative of the approximate position of the machine element 22. That is, if there were no errors in the coupling between the motive means 26 and the machine element 22 the data element 30 would produce a signal which is exactly proportional to the distance of the machine element from a reference position. Hence, if the signal from the command source 20 has the same signal to distance characteristic the signal output of the data element 30 which is fed through signal adder 32 to the comparator 24 will exactly counteract the command signal. The output of the comparator will therefore be zero and the motive means 26 will stop. However, as the machine element is approaching the desired position the comparator 24 produces an error signal at its output which is the difference between the signal of the command source 20 and the signal out of the data element 30 which is representative of the remaining distance to the desired position.

The foregoing discussion presupposes the absence of any error in the coupling means 28 by which the motive means 26 drives the machine element 22. It is, of course, virtually impossible to construct a machine in which there are no errors in the drive train couplings.

In linearly moving devices such as a milling machine table or a lathe carriage, the linear translation is most commonly obtained through the use of a lead screw assembly or a rack pinion assembly. Lead screws are commonly produced with lead errors of as much as .002" per foot to .0002" per foot. When the screw is used the nut which engages it lies up on high points of the threads or on dirt particles thus contributing to the errors in the motion of the nut. The film of lubrication oil between the elements also produces errors in that it acts as a compressible cushion between the elements. Backlash between the elements may introduce a substantial error, especially if ordinary screws and nuts are used rather than ball bearing screws with preloaded double nuts.

Another major source of errors in the lead screw and bearing nut drives are those resulting from the loading which cause compression or elongation of the screw. Torsional windup of the lead screw as well as resilience of the bearing nut are also sufficiently large that they must be accounted for. Similar sources of error are present in rack and pinion drives which will be obvious to one skilled in the art and are, therefore, not enumerated herein.

The deviation measuring means 34 in FIG. 1 is provided to generate an electric signal which is representative of the errors introduced by the coupling means 28. In the systems of this invention the deviation measuring means is coupled to the coupling means either mechanically or electrically so as to measure relative motion of the coupling means with respect to the stationary and/or the moving parts of the machine. For example, in the lead screw and bearing nut type of drive the deviation measuring means measures the change in length of the lead screw by differentially measuring the movement of the end of the screw with respect to a fixed position on the supporting frame of the machine. Also the deviation measuring means 34 may measure by differential means the position of the machine element such as a milling machine table with respect to the lead screw so that the output signal reflects the positional error due to backlash, lead screw high points, dirt, oil film compression, etc.

The error signal output from the deviation measuring means 34 is added to the output from the data element 30 by means of the signal adder 32 and the summation signal is, therefore, representative of the actual position of the machine element 22. Thus, the signal fed to the motive means from the signal comparator 24 is an accurate reflection of the difference between the actual position of the machine element and the desired position to which the machine element is to be moved. It is to be recognized, of course, that the output from the signal adder 32 may be used to actuate a visual position indicator and that the motive means 26 may be manually controllable so that an operator can read the indicated output of the signal adder 32 and control the motive means 26 to stop the machine element 22 at a desired position.

Figure 2:
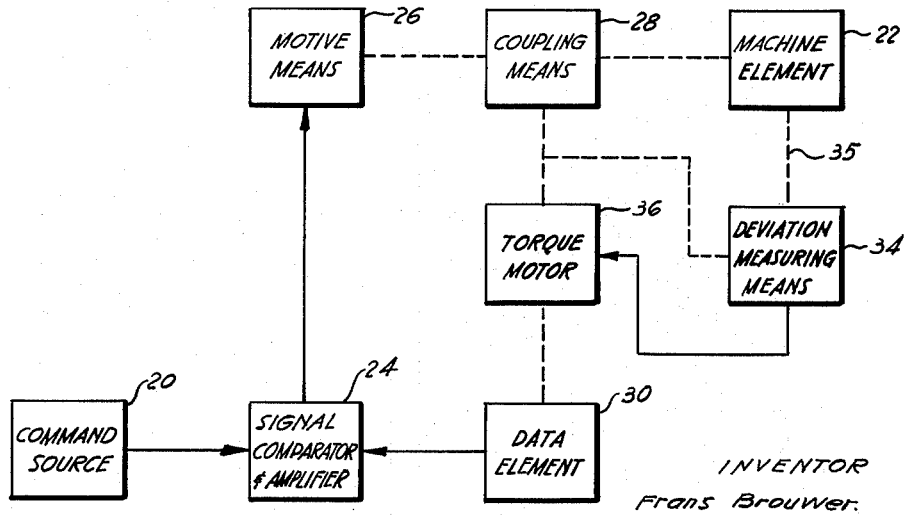
FIG. 2 is a modification of the system of FIG. 1.

The system shown in FIG. 2 is a slight refinement of the system in FIG. 1 and like numbered components thereof perform essentially the same functions as those described in FIG. 1. In this system, however, the error signal derived by the deviation measuring means is used to energize a torque motor, or the like, which is interconnected between the coupling means 28 and data element 30. The torque motor 36 drives the data element 30 with a mechanical input which is representative of movement of the coupling means plus the coupling errors of the machine so that the output thereof is directly representative of the actual position of the machine element 22. In this system the output from the data element may be compared with a command signal to produce an error signal as shown in FIG. 2 or it may be used to actuate a position indicator in a manually controlled system.

Figure 3:
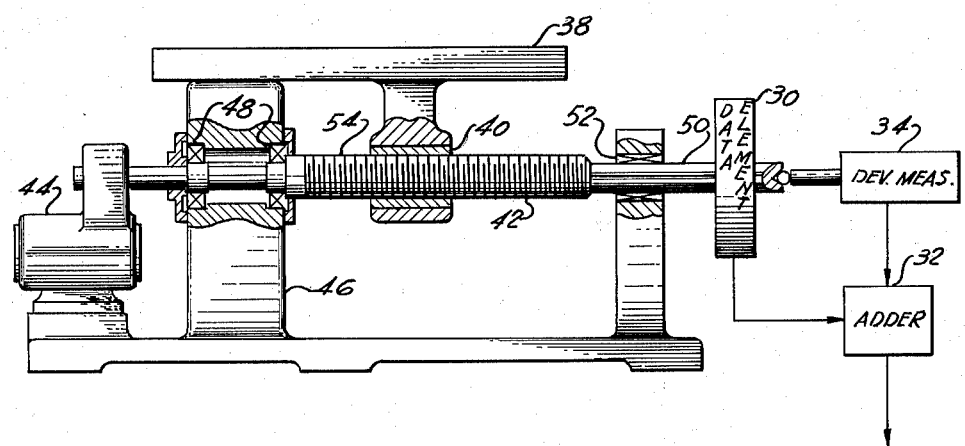
FIG. 3 is an elevation view partly in section and partly in schematic showing a more specific application of the present invention.

Reference is now made to FIG. 3 wherein is portrayed a simple embodiment of this invention in which elimination of errors due to axial deviations in the length of the screw is all that is required. There is shown a conventional drive for a machine element or a table 38 which is positioned by means of a bearing nut 40 connected to the table and interacting with a lead screw 42 rotatably driven at its one end by a drive motor 44. The lead screw 42 is supported for rotation in frame 46 of the machine by means of bearings 48 which axially locate the screw. The free end 50 of the lead screw 42 is journaled in a bearing 52 which permits axial translation of the end of the screw so that the only portion of the screw which is under axial stress is the portion 54 between the bearings 48 and the bearing nut 40. It may be seen that with this arrangement the axial movement of the free end of the screw 50 is due solely to the compression, tension or torsional wind-up of the portion 54 of the lead screw and this axial movement is transferred to the table 38 as a deviational error.

The axial deviation of the free end 50 of the screw is measured by means of deviation measuring means 34, which may take the form of a differential transformer, to provide a signal at its output representative of the error. The signal may be combined in signal adder 32 with the output from a data element 30 which provides a signal representative of the position of the table 38 if there were no coupling errors. The signal at the output of the adder is, therefore, proportional to the actual position of the table 38 assuming, of course, there are no backlash errors or the like between the lead screw 42 and the bearing nut 40.

If the errors due to backlash and resilience between screw and the nut or for local variations in the lead of the screw are too large, a further correction is desirable. This involves the mounting of an extra transducer on the table around the unloaded side of the screw as will be hereinafter described with respect to FIG. 4. The correction signal from the extra transducer is also added to the signal from the data element.

Figure 4:
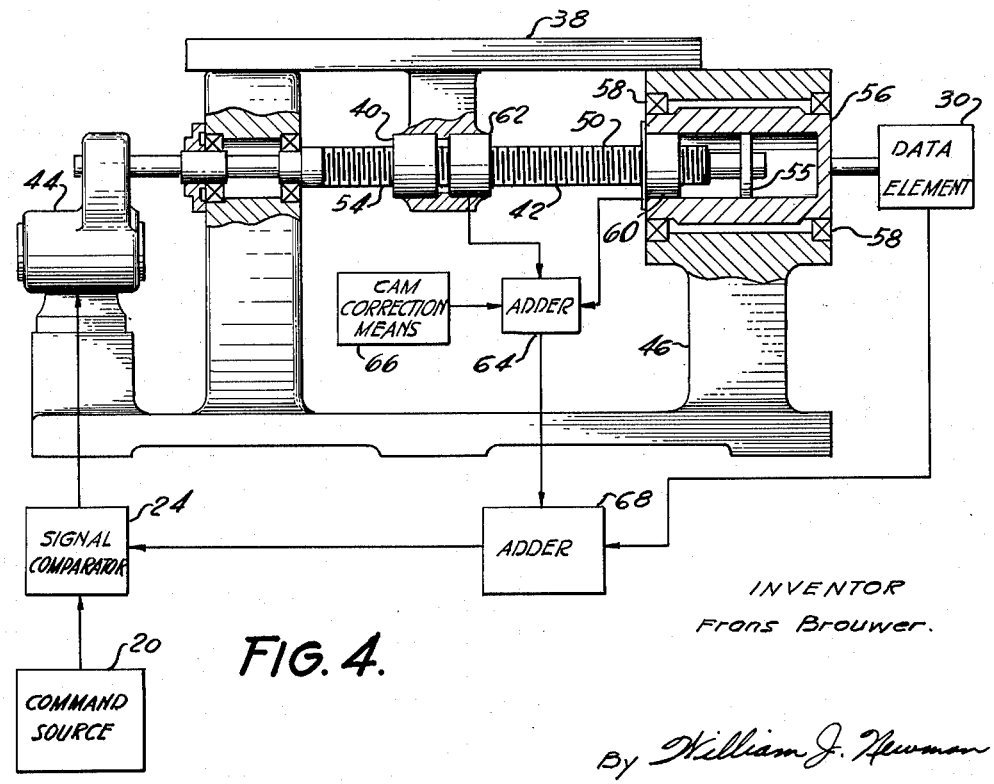
FIG. 4 is an elevation view partially in section and partly in schematic showing another specific embodiment of the invention.

The system of FIG. 4 comprises a drive motor 44 with a rotary to linear movement converter formed by lead screw 42 and bearing nut 40 attached to the table 38. In this system, however, the free end 50 of the lead screw 42 is mechanically coupled at 55 to rotate an element 56 which is journaled within the machine frame 46 by means of preloaded precision-type bearings 58. The coupling 55 may be of any type which will cause the element 56 to rotate directly with the screw 42 but which will permit relative axial movement therebetween. The element 56 in turn drives data element 30 whose output signal is representative of the approximate position of the table 38.

The element 56 carries a transducer 60, for rotation therewith which is an electric coil arrangement interacting with the threads on the lead screw 42 to measure the axial deviation of the free end 50 of the screw caused by compressions, tensions or torsional windings of the confined portion 54 of screw 42. The transducer 60 provides an electric signal which is indicative of the error caused by the axial deviation of the screw. Embodiments of the transducer 60 will be described hereinafter with respect to FIGS. 5 through 9. The transducer 60 provides the same measurement function as the differential transformer mentioned as the deviation measuring means 34 with respect to FIG. 3.

In order to measure the error due to bearing nut backlash, resiliency and local screw errors a second transducer 62 is mechanically attached to the table 38 to move therewith. This transducer also interacts with the lead screw 42 in a manner to be later explained, and in view of its fixed relation with respect to the bearing nut 40 measures the changes in relationship between the threads on the bearing nut 40 and the threads on the lead screw 42.

The output signals from the transducers 60 and 62 and are added in the adder circuit 64 so that its output is representative of any errors in the screw or bearings other than the normal lead errors of the screw.

It will be shown that the particular transducers contemplated for use have an averaging effect so that lead error curves of the lead screw are smooth. These errors are related to the physical construction of the screw and, of course, are repeatable during each operation of the mechanism. Hence, a suitable electro-mechanical cam correction means 66 may be employed to provide a signal to the adder 64 so that the output takes into account all of the errors of the coupling means.

The particular system shown in FIG. 4 includes a second adder circuit 68 which provides a signal at its output which is proportional to the summation of the position signal from data element 30 and the error signal from adder circuit 64. The signal at the output of adder 68 is proportional to the actual position of the table 38 and is compared at 24 with the command signal to provide a signal difference which is used to energize the drive motor 44.

FIG. 5 shows an embodiment similar to that shown in FIG. 4 but modified for use in the systems shown in FIG. 2. In this figure again, like numbered components serve similar functions to those in FIG. 4. The main difference in this system is in the coupling between the free end 50 of the lead screw 42 and the data element 30. In this embodiment the free or undriven end 50 of the screw is journaled for rotation with respect to the element 56 by means of a floating bearing 70. The element 56 is, of course, rotatable with respect to the frame 46 by means of the preloaded precision bearings 58. A torque motor 36 is interposed between the free end 50 of the screw 42 and the element 56 so that the lead screw will turn the element 56 and, hence, the data element 30. The torque motor 36 provides a means for correcting the output of the data element 30 responsive to error signals which are combined in the adder 64 from the transducers 60 and 62 as well as the cam correction means 66. As described with respect to the system of FIG. 2, the output of the data element with the correction for the errors supplied by the torque motor 36 represents the actual position of the table 38 and is compared to the command signal to provide the drive motor energization signal as hereinbefore described.

The transducers 62 forming the deviation measuring means 34 in the systems of FIGS. 4 and 5 are preferably of the nulling type which produce zero signal when the errors to be measured are properly accounted for. A preferred type of transducer is shown in FIG. 6 with its attendant circuitry shown in FIG. 7.

The transducer comprises a pair of bifilar wound coils 72a, 72b which are preferably set in an insulating shell 74 to maintain them in rigid position. The coil assembly is adapted to be positioned concentrically about the lead screw 42 of the machine so that the tooth crests 76 lie closely adjacent the coils 72a and 72b. It will be noted that each coil has a pitch as represented by the dimension 78 which is equal to the pitch of the lead screw 42. The two coils 72a and 72b are uniformly interspaced so that in an aligned position such as shown in FIG. 6 the windings in coil 72b are opposite the crest of the thread along its entire length while the windings of coil 72a are opposite the roots of the thread along its entire length.

It may be seen that if the coils are energized by an alternating current source and if the lead screw 42 is of electrically conductive or magnetic material the effects of the lead screw on the impedance of coil 72b will be substantially greater than lead screw effects on the impedance of coil 72a. If the two coils are connected in a circuit such as shown in FIG. 7 which includes a balanced secondary transformer 82, a maximum amplitude signal will appear at the output terminals 84 having a particular phase orientation with the positional relationship shown in FIG. 6. If the lead screw 42 is physically shifted with respect to the transducer coils 72a and 72b so that the winding 72a is opposite the crests and the winding of 72b is opposite the roots, the output signal at 84 will again have maximum amplitude with a phase shift of 180° from the first described configuration. Between these two maximum signal positions there is a null signal position in which the crests 76 of the thread are equally spaced between the adjacent windings of the two coils 72a and 72b.

When the transducer in FIG. 6 is used in the systems described in FIGS. 1 through 4, the nulling position between the screw and the transducer coils serves as the reference position which is indicative of no coupling error, and the phase sensitive signal generated when there is a displacement to either side of the nulling position provides the error indication. For example, in the system of FIG. 4 the transducer 60, which includes the coils 72a and 72b, is caused to rotate with the lead screw 42. The coils are positioned with respect to the lead screw 50 so that they provide a null signal under no load conditions. However, with a load sufficient to cause axial translation of the free end 50 of the screw the threads will be axially translated with respect to the coil windings and the impedances of the coils 72a and 72b will become unbalanced to provide an error signal to the adder 64. This error signal will be reflected back to the drive motor to drive the table and compensate for the error in typical servo-mechanism manner.

This transducer as used for the bearing error measuring means 62 operates in a similar manner; that is, it is initially positioned with respect to the screw 42 so that it provides a null signal when the table 38 is at the exact position designated by the command source 20. Under this condition the thread crests 76 are equally spaced between the adjacent windings of the coils. If, however, due to backlash or other errors the table is leading or lagging the desired position the impedances of the coils become unbalanced, and a phase sensitive signal is transmitted to the adder 64.

It is to be understood that the coils 72a and 72b may take a number of different forms and configurations while still providing the same result as hereinbefore described. For example, FIG. 8 shows a transducer configuration using two bifilar coil assemblies 86a and 86b respectively. The coils in each assembly 86a and 86b are interconnected at their one ends 88a and 88b respectively and each have a pitch equal to the pitch of the threads of the lead screw 42.

The transducer of FIG. 8 may then be connected in a circuit such as shown in FIG. 9 which eliminates the need for a balanced transformer. FIG. 9 shows each coil separately with prime symbol designations to correspond with the correspondingly primed reference numbers in FIG. 8. In this circuit the four coils 86a′, 86a″, 86b′, and 86b″ form a full bridge circuit in such a way that displacement of the lead screw 42 causes diametrically opposed coils to change their inductance in the same direction. A null signal is provided at the output terminals 87 for an errorless position in much the same fashion as described with respect to the transducer of FIG. 6.

FIG. 10 shows another embodiment of a transducer which may be used in the described systems. This transducer comprises a pair of bifilar wound coils 90a and 90b each formed of a spiralled flat wire so as to be in capacitive relationship with the nut threads of screw 42. The coils 90a and 90b are imbedded in the inner surface of a tubular insulating member 92 for constructional rigidity.

Each of the coils has a capacitance with respect to the grounded screw 42, and these values are identical if the screw threads are symmetrically displaced with respect to the coils. Small deviations from the center position result in a capacitive unbalance which may be detected in a bridge type circuit 93 which is similar to that shown in FIG. 7. A null signal at terminals 95 indicates the errorless position in the same manner as previously described.

The inductive or capacitive transducers are equally practicable for use with multistart screws as long as at least one pair of windings or electrodes are of the same lead as the screw. Preferably one pair should be used for each thread and the corresponding elements interconnected for maximum signal strength.

Figure 11:
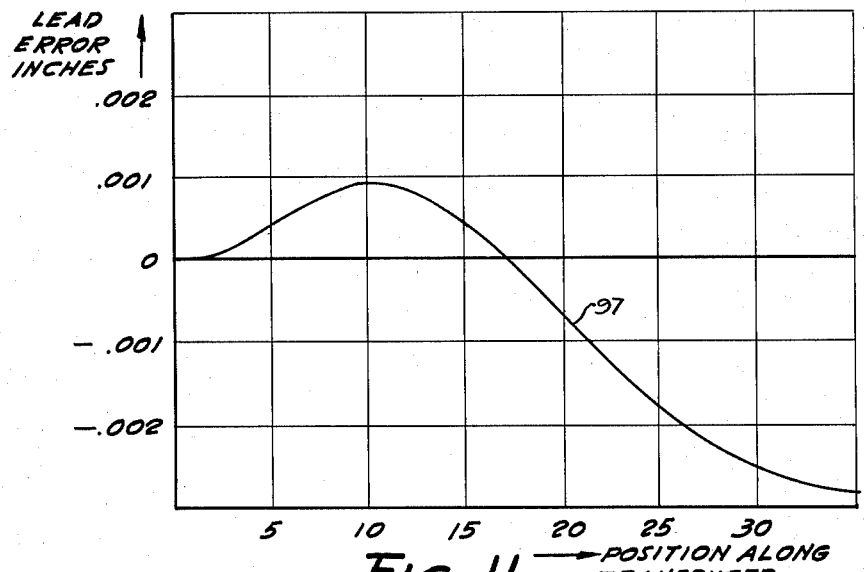
FIG. 11 is a graph showing bearing nut lead errors along the length of the lead screw.

One excellent property of the transducers hereinbefore described is their averaging effects of local errors in the coupling means. Small local errors in the lead screw effect only one winding on the coils whereas displacement between the coils and the lead screw affects all of the windings. Hence, the local errors are reduced by a substantial factor and actually become quite small. Due to this averaging effect an error curve 97 for these transducers is a smooth flowing graph such as shown in FIG. 11. The cam corrective means 66 may be constructed to compensate for the errors shown by this graph and provide a signal to the adder 64 so as to give a truly accurate table position signal.

Figure 12:
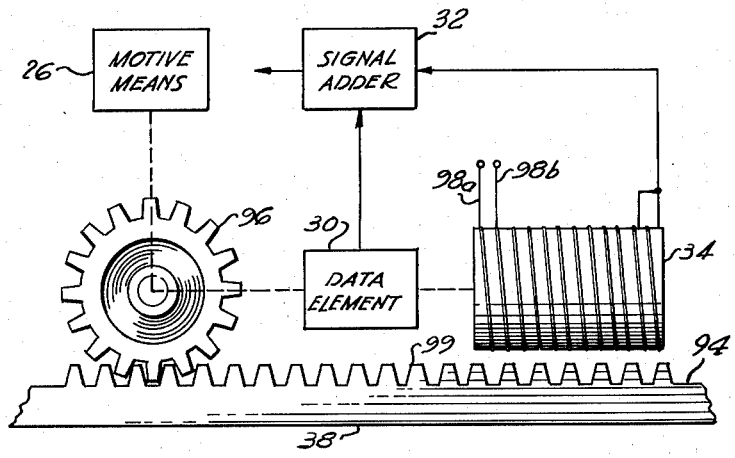
FIG. 12 is a schematic representation of another embodiment of the invention for use with a rack and pinion drive.

Reference is now made to FIG. 12 in which a system embodying this invention is applied to a machine using a rack 94 and pinion 96. A data element 30 is driven with the pinion 96 to provide a signal at its output which is approximate to the position of the table 38. The motive means 26 also turns a deviation measuring means 34 which may take the form of an assembly including a pair of helical-wound, balanced coils 98a and 98b similar to the ones for the transducer shown in FIG. 6. In this case, however, the coils are wound on the outside of the insulating shell 100 so that they may interact with the teeth of the rack 94 in a manner similar to the interaction of the transducer and lead screw of FIG. 6. Each of the coils 98a and 98b have a pitch equal to the pitch of the rack teeth 99 and the coils provide a null signal whenever the coil windings are symmetrical with respect to the rack teeth. It may be seen that this null condition is maintained as the deviation measuring transducer 34 is rotated as long as the portions of the windings 98a and 98b confronting the rack teeth 99 move along in their symmetrical position with respect to the teeth. Deviations from the symmetrical position caused by errors in the coupling are transformed into a signal representation at the output of the deviation measuring means 34. This is applied to the signal adder 32 where it is combined with the data element signal to produce a signal representative of the actual position of the machine table 38.

The system shown in FIG. 12 is, generally representative of the system in the block diagram of FIG. 1, but it is to be understood that it may be readily modified to a configuration such as shown in FIG. 2. For example, the data element 30 might be located on the other side of the deviation measuring means 34 with respect to the pinion 96, and a torque motor may be positioned therebetween so that the output signal from the deviation measuring means 34 is transmitted to the torque motor to adjust its output to represent the actual table position.

While several embodiments of this invention have been shown and/or discussed it is to be understood that many modifications and additions may be made by a person skilled in the art without deviating from the teachings of this invention. It is, therefore, intended that the invention be limited only by the scope of the appended claims.

What is claimed is:

1. In combination with a machine having an element for positional control, control apparatus comprising motive means, means for mechanically coupling said element to said motive means for positioning said element, means driven by said coupling means for producing a first signal representing approximately the position of said element, means electrically coupled with said coupling means for producing a second signal representing the mechanical error introduced by said coupling means, means for adding said signals to produce a third signal representing the actual position of said element, means for producing a reference signal and means for comparing said third signal with said reference signal to provide an energizing signal for said motive means.

2. In combination with a machine having an element for positional control, control apparatus comprising motive means, means for mechanically coupling said element to said motive means for positioning said element, means driven by said coupling means for producing a first signal representing approximately the position of said element, means electrically coupled with said coupling means for producing a second signal representing the mechanical error introduced by said coupling means, means responsive to said second signal for varying said first signal in accordance therewith, means for producing a reference signal and means for comparing said first signal with said reference signal to provide an energizing signal for said motive means.

3. In combination with a machine having an element for positional control, control apparatus comprising motive means, means for mechanically coupling said element to said motive means for positioning said element, means driven by said coupling means for producing a first signal representing approximately the position of said element, means including said coupling means for producing a second signal representing the mechanical error introduced by said coupling means, and means for adding said signals to produce a third signal representing the actual position of said element.

4. In combination with a machine having an element for positional control, control apparatus comprising motive means, means for mechanically coupling said element to said motive means for positioning said element, means driven by said coupling means for producing a first signal representing approximately the position of said element, means including said coupling means for producing a second signal representing the mechanical error introduced by said coupling means, and means for varying the first signal in accordance with said second signal to represent the actual position of said element.

5. In combination with a machine having an element for positional control, control apparatus comprising rotary motive means, means including a lead screw and drive nut for mechanically coupling said element to said motive means for positioning said element, means driven by said lead screw coupling means for producing a first signal representing approximately the position of said element, means coupled with said lead screw coupling means for producing a second signal representing the mechanical error introduced by said mechanical coupling means, and means for adding said signals to produce a third signal representing the actual position of said element.

6. In combination with a machine having an element for positional control, control apparatus comprising rotary motive means, means including a rack and pinion, for mechanically coupling said element to said motive means for positioning said element, means driven by said pinion coupling means for producing a first signal representing approximately the position of said element, means electrically coupled with said rack for producing a second signal representing the mechanical error introduced by said mechanical coupling means, and means for adding said signals to produce a third signal representing the actual position of said element.

7. In combination with a machine having an element for positional control, control apparatus comprising rotary motive means, a lead screw driven at one end by said motive means, a bearing nut fixed to said element in operational engagement with said lead screw, means operable with said lead screw to produce a first signal representing approximately the position of said element, a first pair of interspaced helical-wound coils each having a lead equal to the lead of said screw, means mounting said coils concentrically about the undriven end of said screw to rotate about the axis thereof, means including said first pair of coils for producing a second signal representing the mechanical error caused by repetitive changes in the length of said screw, a second pair of interspaced, helical-wound coils each having a lead equal to the lead of said screw, means fixedly mounting said second pair of coils to said element and concentrically about said screw, means including said second pair of coils for producing a third signal representing the mechanical error caused by the coupling between said screw and said bearing nut and means for adding said signals to provide a fourth signal representing the actual position of said element.

8. In combination with a machine having an element for positional control, control apparatus comprising rotary motive means, a lead screw driven at one end by said motive means, a bearing nut fixed to said element in operational engagement with said lead screw, means operable with said lead screw to produce a first signal representing approximately the position of said element, a first pair of interspaced, helical-wound coils each having a lead equal to the lead of said rack, means mounting said coils concentrically about the undriven end of said screw to rotate about the axis thereof, means including said first pair of coils for producing a second signal representing the mechanical error caused by repetitive changes in the length of said screw, a second pair of interspaced, helical-wound coils each having a lead equal to the lead of said screw, means fixedly mounting said second pair of coils to said element and concentrically about said screw, means including said second pair of coils for producing a third signal representing the mechanical error caused by the coupling between said screw and said bearing nut, means for summing said second and third signals, and means operative responsive to the summing of said signals for varying said first signal in accordance therewith.

9. In combination with a machine having an element for positional control, control apparatus comprising rotary motive means, a lead screw driven at one end by said motive means, a bearing nut fixed to said element in operational engagement with said lead screw, means operable with said lead screw to produce a first signal representing approximately the position of said element, a first pair of interspaced, helical-wound coils each having a lead equal to the lead of said screw, means mounting said coils concentrically about the undriven end of said screw to rotate about the axis thereof, means including said first pair of coils for producing a second signal representing the mechanical error caused by repetitive changes in length of said screw, a second pair of interspaced, helical-wound coils each having a lead equal to the lead of said screw, means fixedly mounting said second pair of coils to said element and concentrically about said screw, means including said second pair of coils for producing a third signal representing the mechanical error caused by the coupling between said screw and said bearing nut, means for adding said signals to provide a fourth signal representing the actual position of said element, means for producing a reference signal and means for comparing said fourth signal with said reference signal to provide an energizing signal for said motive means.

10. In combination with a machine having an element for positional control, control apparatus comprising rotary motive means, a lead screw driven at one end by said motive means, a bearing nut fixed to said element in operational engagement with said lead screw, a data element operable with said lead screw to produce a first signal representing approximately the position of said element, a first pair of interspaced helical-wound coils each having a lead equal to the lead of said screw, means mounting said coils concentrically about the undriven end of said screw to rotate about the axis thereof, means including said first pair of coils for producing a second signal representing the mechanical error caused by repetitive changes in the length of said screw, a second pair of interspaced, helical-wound coils each having a lead equal to the lead of said screw, means fixedly mounting said second pair of coils to said element and concentrically about said screw, means including said second pair of coils for producing a third signal representing the mechanical error caused by the coupling between said screw and said bearing nut, means for summing said second and third signals, means including a torque motor and operative responsive to the summing of said signals for operating said data element to vary said first signal, means for producing a reference signal and means for comparing said first signal with said reference signal to provide an energizing signal for said motive means.

11. In combination with a machine having an element for positional control, control apparatus comprising rotary motive means, a lead screw driven at one end by said motive means, a bearing nut fixed to said element in operational engagement with said lead screw, means operable with said lead screw to produce a first signal representing approximately the position of said element, a first pair of inter-spaced helical-wound coils each having a lead equal to the lead of said screw, means mounting said coils concentrically about the undriven end of said screw to rotate about the axis thereof, means including said first pair of coils for producing a second signal representing the mechanical error caused by repetitive changes in the length of said screw, a second pair of inter-spaced, helical-wound coils each having a lead equal to the lead of said screw, means fixedly mounting said second pair of coils to said element and concentrically about said screw, means including said second pair of coils for producing a third signal representing the mechanical error caused by the coupling between said screw and said bearing nut, means for summing said second and third signals, means operative responsive to the summing of said signal for varying the first signal in accordance therewith, means for producing a reference signal and means for comparing said first signal with said reference signal to provide an energizing signal for said motive means.

12. In combination with a machine having an element for positional control, control apparatus comprising rotary motive means, a lead screw driven at one end by said motive means, a bearing nut fixed to said element in operational engagement with said lead screw, a data element operable with said lead screw to produce a first signal representing approximately the position of said element, means coupled to the undriven end of said lead screw for producing a second signal representing the change in axial length of said screw due to loading, and means for varying said first signal in accordance with said second signal to produce a third signal representing the actual position of said element.

13. In combination with a machine having an element for positional control, control apparatus comprising rotary motive means, a lead screw driven at one end by said motive means, a bearing nut fixed to said element in operational engagement with said lead screw, a data element operable with said lead screw to produce a first signal representing approximately the position of said elements, a differential transformer mechanically coupled to the undriven end of said lead screw for producing a second signal representing the change in axial length of said screw due to loading, and means for varying said first signal in accordance with said second signal to produce a third signal representing the actual position of said element.

14. In combination with a machine having an element for positional control, control apparatus comprising rotary motive means including a pinion, a rack on said element in operational engagement with said pinion, means operable with said pinion to produce a first signal representing approximately the position of said element, a pair of interspaced helical-wound coils each having a lead equal to the lead of said rack, means mounting said coils for rotation with said pinion about an axis parallel to said rack with a portion of the circumference of said coils adjacent said rack, means including said coils for producing a second signal proportional to the mechanical error between said rack and said pinion, and means for adding said signals to produce a third signal representing the actual position of said element.

15. In combination with a machine having an element for positional control, control apparatus comprising rotary motive means including a pinion, a rack on said element in operational engagement with said pinion, means operable with said pinion to produce a first signal representing approximately the position of said element, a pair of interspaced helical-wound coils each having a lead equal to the lead of said rack, means mounting said coils for rotation with said pinion about an axis parallel to said rack with a portion of the circumference of said coils adjacent said rack, means including said coils for producing a second signal proportional to the mechanical error between said rack to said pinion, and means for varying the first signal in accordance with said second signal to represent the actual position of said element.

16. In combination with a machine having an element for positional control, control apparatus comprising rotary motive means including a pinion, a rack on said element in operational engagement with said pinion, means operable with said pinion to produce a first signal representing approximately the position of said element, a pair of interspaced helical-wound coils each having a lead equal to the lead of said rack, means mounting said coils for rotation with said pinion about an axis parallel to said rack with a portion of the circumference of said coils adjacent said rack, means including and coils for producing a second signal proportional to the mechanical error between said rack and said pinion, means for adding said signal to produce a third signal representing the actual position of said element, means for producing a reference signal and means for comparing said third signal with reference signal to provide an energizing signal for said motive means.

17. In combination with a machine having an element for positional control, control apparatus comprising rotary motive means including a pinion, a rack on said element in operational engagement with said pinion, means operable with said pinion to produce a first signal representing approximately the position of said element, a pair of interspaced helical wound coils each having a lead equal to the lead of said rack, means mounting said coils for rotation with said pinion about an axis parallel to said rack with a portion of the circumference of said coils adjacent said rack, means including said coils for producing a second signal proportional to the mechanical error between said rack and said pinion, means operably responsive to said second signal for varying the first signal in accordance therewith, means for producing a reference signal, and means for comparing said first signal with said reference signal to provide an energizing signal for said motive means.

18. In combination with a machine having an element for positional control, control apparatus comprising rotary motive means including a pinion, a rack on said element in operational engagement with said pinion, a data element operable with said pinion to produce a first signal representing approximately the position of said element, a pair of interspaced helical-wound coils each having a lead equal to the lead of said rack, means mounting said coils for rotation with said pinion about an axis parallel to said rack with a portion of the circumference of said coils adjacent said rack, means including said coils for producing a second signal proportional to the mechanical error between said rack and said pinion, means including a torque motor and responsive to said second signal for operating said data element to vary the first signal, means for producing a reference signal and means for comparing said first signal with said reference signal to provide an energizing signal for said rotary motive means.

19. A device for indicating relative translation between two bodies comprising a first electrical winding fixed on one of said bodies and having a regular repetitive configuration of predetermined pitch, a second electrical winding fixed on said one body having a substantially identical regular repetitive configuration of said predetermined pitch and superimposed on said first winding in a uniformly spaced manner, means for imposing an electric signal on said winding, nonsignal carrying means on the other of said bodies arranged in a regular and repetitive configuration of equal pitch as said windings for affecting the electrical characteristics of said windings as said means is translated relative to said windings, and means including said signal imposing means for determining the change in electrical characteristics of said windings due to relative translation of said bodies.

20. In an electrical signal producing device for use with a machine lead screw or the like, a transducer comprising a pair of helical-wound, uniformly interspaced coils each having a pitch equal to said screw, said pair of coils adapted to be mounted concentrically about said screw and impedance coupled with the threads thereof whereby relative axial translation between said coils and the threads cause the electrical characteristics of said coils to vary.

21. In an electric signal producing device for use with a machine lead screw or the like, a transducer comprising a pair of helical-wound uniformly interspaced coils each having a pitch equal to said screw, said pair of coils adapted to be mounted concentrically about said screw and inductively coupled with the threads thereof whereby relative axial translation between said coils and the threads cause the electrical characteristics of said coils to vary.

22. In an electric signal producing device for use with a machine lead screw or the like, a transducer comprising a pair of helical-wound uniformly interspaced coils each having a pitch equal to said screw, said pair of coils adapted to be mounted concentrically about said screw and capacitively coupled with the threads thereof whereby relative axial translation between said coils and the threads cause the electrical characteristics of said coils to vary.

References Cited by the Examiner

UNITED STATES PATENTS

| | | | |
|---|---|---|---|
| 2,982,145 | 5/1961 | Orner | 74—424.8 |
| 3,038,352 | 6/1962 | Murphy | 74—424.8 X |
| 3,048,044 | 8/1962 | Adams et al. | 74—5.47 |
| 3,068,705 | 12/1962 | Le Tilly et al. | 74—5.4 |
| 3,092,742 | 6/1963 | Smith et al. | 74—388 X |
| 3,159,038 | 12/1964 | Brown | 74—388 X |

DON A. WAITE, *Primary Examiner.*